US012800302B2

(12) United States Patent
Ohmuro et al.

(10) Patent No.: US 12,800,302 B2
(45) Date of Patent: Nov. 17, 2026

(54) DISTANCE DETECTION DEVICE, OPTICAL INSTRUMENT, AND ATTITUDE DETECTION METHOD FOR DISTANCE DETECTION DEVICE

(71) Applicant: NIKON VISION CO., LTD., Tokyo (JP)

(72) Inventors: Hitoshi Ohmuro, Tokyo (JP); Masahiro Shiozawa, Yokohama (JP)

(73) Assignee: NIKON VISION CO., LTD., Tokyo (JP)

( * ) Notice: Subject to any disclaimer, the term of this patent is extended or adjusted under 35 U.S.C. 154(b) by 1474 days.

(21) Appl. No.: 17/044,865

(22) PCT Filed: Apr. 5, 2018

(86) PCT No.: PCT/JP2018/014636
§ 371 (c)(1),
(2) Date: Oct. 5, 2020

(87) PCT Pub. No.: WO2019/193726
PCT Pub. Date: Oct. 10, 2019

(65) Prior Publication Data

US 2021/0148703 A1 May 20, 2021

(51) Int. Cl.
*G01S 7/481* (2006.01)
*G01C 3/08* (2006.01)
(Continued)

(52) U.S. Cl.
CPC .................. *G01C 3/08* (2013.01); *G01C 3/32* (2013.01); *G02B 27/646* (2013.01)

(58) Field of Classification Search
CPC .......... G01C 3/08; G01C 3/32; G02B 27/646; G01S 7/4814; G01S 7/4972
See application file for complete search history.

(56) References Cited

U.S. PATENT DOCUMENTS

| | | | | |
|---|---|---|---|---|
| 10,027,891 B2 | 7/2018 | Masuda | | |
| 2015/0362588 A1* | 12/2015 | Ohmuro | G01S 7/497 | 356/5.04 |
| 2016/0065942 A1* | 3/2016 | Park | H04N 13/271 | 348/46 |

FOREIGN PATENT DOCUMENTS

| | | | |
|---|---|---|---|
| EP | 3196593 A1 | 7/2017 | |
| JP | 2000187151 A | 7/2000 | |

(Continued)

OTHER PUBLICATIONS (ISA/237) Written Opinion of the International Search Authority for International Patent Application No. PCT/JP2018/014636, issued/mailed by the Japan Patent Office on May 29, 2018.

(Continued)

*Primary Examiner* — Isam A Alsomiri
*Assistant Examiner* — Sanjida Naser

(57) ABSTRACT

A range finder 10 according to the present embodiment includes a first sensor 440 configured to detect an attitude of a body of the range finder, a correction lens 410 configured to be driven based on a shaking amount detected by a shaking detection sensor 442, a second sensor 450 configured to detect a position of the correction lens, and a processing unit 300 configured to determine an irradiating angle of light. The processing unit can determine, based on a detection result of the attitude of the body by the first sensor and a detection result of the position of the correction lens by the second sensor, the irradiating direction (i.e. measurement direction) in which the light deflected by the correction lens which position is corrected according to the shaking amount of the attitude of the body determined from the detection result of the second sensor is actually irradiated.

23 Claims, 8 Drawing Sheets

(51) Int. Cl.

| | |
|---|---|
| ***G01C 3/32*** | (2006.01) |
| ***G01S 7/48*** | (2006.01) |
| ***G01S 7/4865*** | (2020.01) |
| ***G01S 17/88*** | (2006.01) |
| ***G02B 3/00*** | (2006.01) |
| ***G02B 27/30*** | (2006.01) |
| ***G02B 27/64*** | (2006.01) |

(56) References Cited

FOREIGN PATENT DOCUMENTS

| | | | | |
|---|---|---|---|---|
| JP | 2009085658 A | 4/2009 | | |
| JP | 2014115191 A | 6/2014 | | |
| JP | 2015150061 A | 8/2015 | | |
| JP | 2017049076 A | 3/2017 | | |
| WO | WO-2016030925 A1 * | 3/2016 | ............... | G01C 3/06 |
| WO | 2016151927 A1 | 9/2016 | | |

OTHER PUBLICATIONS

[online], Oct. 6, 2016, [retrieved on May 14, 2018], Internet ,URL: http://web.archive.org/web/20170519175721/http://www.nikonvision.co.jp/products/dl/catalogue/COOLSHOT_Brochure_201610_jp.pdf(Nikon Vision Co., Ltd.) (Golf laserrangefinders).

International Preliminary Report on Patentability for International Application No. PCT/JP2018/014636, issued by the International Bureau of WIPO on Oct. 6, 2020.

* cited by examiner

DISTANCE DETECTION DEVICE, OPTICAL INSTRUMENT, AND ATTITUDE DETECTION METHOD FOR DISTANCE DETECTION DEVICE

The contents of the following Japanese patent application are incorporated herein by reference:

NO. PCT/JP2018/014636 filed in WO on Apr. 5, 2018.

BACKGROUND

1. Technical Field

The present invention relates to a distance detection device, an optical instrument, and a method for detecting an attitude of a distance detection device.

2. Related Art

A distance detection device (also referred to simply as a range finder) with an image blur correction (also referred to as a hand shaking correction) function is known (for example, see Patent document 1.) There is a problem that, when the image blur correction function is activated and measurement light is deflected, the direction (i.e. the azimuth and angle) of a reference axis determined from an attitude of a body does not reflect the direction in which the light is actually irradiated (i.e. the range finding direction.)

Patent document 1: Japanese Patent Application Publication No. 2000-187151

GENERAL DISCLOSURE

A first aspect of the present invention provides a distance detection device for measuring a distance to an object by irradiating light including:

a first sensor configured to detect an attitude of the distance detection device;

a shaking correction optical system configured to be driven based on a shaking amount detected by a shaking detection sensor;

a second sensor configured to detect a position of the shaking correction optical system; and a processing unit configured to determine an irradiating angle of the light based on detection results of the first sensor and the second sensor.

A second aspect of the present invention provides an optical instrument having an observation optical system for observing an object including:

a first sensor configured to detect an attitude of the optical instrument;

a shaking correction optical system configured to be driven based on a shaking amount detected by a shaking detection sensor;

a second sensor configured to detect a position of the shaking correction optical system; and a processing unit configured to determine an observation angle of the object based on detection results of the first sensor and the second sensor.

A third aspect of the present invention provides a distance detection device for measuring a distance to an object by irradiating light including:

a first sensor configured to detect an attitude of the distance detection device;

a shaking correction optical system configured to be driven based on a shaking amount detected by a shaking detection sensor; and a second sensor configured to detect a position of the shaking correction optical system, wherein the distance detection device is configured to determine a first angle based on a detection result of the first sensor when a shaking has not occurred, and determine a second angle by correcting the first angle using a correction angle determined based on a detection result of the second sensor when the shaking has occurred.

A fourth aspect of the present invention provides a method for detecting an attitude of a distance detection device for measuring a distance to an object by irradiating light including:

detecting an attitude of the distance detection device;

driving a shaking correction optical system based on a shaking amount detected by a shaking detection sensor;

detecting a position of the shaking correction optical system; and determining an irradiating angle of the light based on detection results of the attitude of the distance detection device and the position of the shaking correction optical system.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through the embodiments of the invention. However, the following embodiments do not limit the claimed invention. In addition, all of the combinations of the features described in the embodiment are not necessarily required for the solution of the invention.

Figure 1:
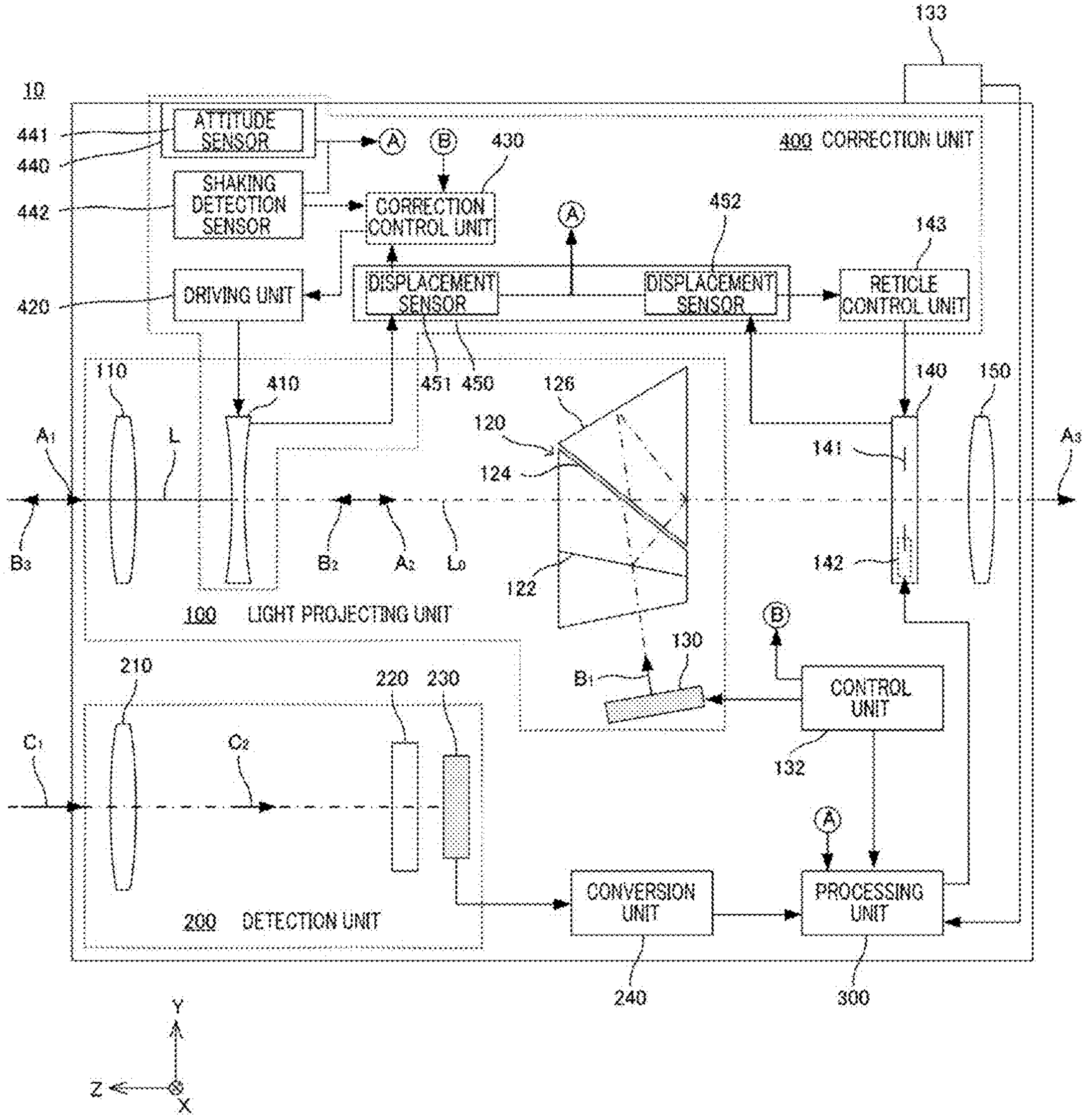
FIG. 1 shows a configuration of a range finder according to the present embodiment.

FIG. 1 shows a configuration of a range finder 10 according to the present embodiment. The range finder 10 is a distance detection device for measuring a distance to an object and/or a height by irradiating light, and, in a device with an image blur correction function, is capable of determining an irradiating direction in which the measurement light deflected by the function is irradiated (i.e. a measurement direction). In this context, the direction in which a light projecting unit 100 emits the measurement light along a reference axis $L_0$, i.e. the arrow direction of a light beam $B_3$ is supposed to be the front, and its opposite direction, i.e. the arrow direction of a light beam $A_3$ is supposed to be the rear. Note that the orientation (also referred to as the direction) of the reference axis $L_0$ is uniquely defined by the orientation of the body (i.e. an enclosure that houses each component) of the range finder 10. The direction means, unless particularly specified otherwise, a direction in a reference coordinate (also referred to as an absolute direction) defined by a horizontal plane through the body (i.e. a first axis arbitrarily defined on the horizontal plane and a second axis orthogonal to the first axis) and a vertical axis (i.e. a third axis.) The range finder 10 includes a light projecting unit 100, a reticle plate 140, an eye piece 150, a correction unit 400, a control unit 132, a detection unit 200, a conversion unit 240, and a processing unit 300.

The light projecting unit 100 is a unit for irradiating measurement light (also simply referred to as light) to an object along the reference axis $L_0$. The light projecting unit 100 has a light emitting unit 130, an erecting prism 120, and an objective lens 110.

The light emitting unit 130 is configured to emit pulsed measurement light (i.e. a light beam $B_1$) toward the erecting prism 120 in a constant period by using a light source. As the light source, for example, a semiconductive laser that oscillates infrared light can be employed. The light emitting unit 130 is configured to emit a predetermined number of, for example 320 shots of, measurement light in a constant period, for example a period of 500 to 700 μs, in one range finding operation.

The erecting prism 120 is an optical element configured to send the measurement light emitted from the light emitting unit 130 forward and send the incident light beam to the rear eye piece 150. As the erecting prism 120, for example, a roof prism, a porro prism, or the like can be employed. The erecting prism 120 has a dichroic reflection surface 122 that reflects visible light band light and transmits infrared band light, and total reflection surfaces 124, 126 that have high reflectance for both of visible light band and infrared band. The measurement light (light beam $B_1$) transmits through the dichroic reflection surface 122 and then is reflected at the total reflection surface 124, and propagates forward within the light projecting unit 100 as a light beam $B_2$ in the erecting prism 120. The incident light beam (a light beam $A_1$) is reflected by the dichroic reflection surface 122, the total reflection surfaces 124, 126, and another reflection surface in the erecting prism 120. Thus, an inverted mirror image formed by the incident light beam is inverted to an erect normal image.

The objective lens 110 is an optical element configured to collimate the light beam $B_2$ that is outputted from the erecting prism 120 and enters via a correction lens 410 described below, and send it to the front of the range finder 10 as a light beam $B_3$.

The reticle plate 140 is a plate-shaped optical element provided with a reticle, and is arranged on a focal position of the objective lens 110. In the present embodiment, the reticle plate 140 is driven in a plane orthogonal to an optical axis of a collimation unit described below (which apparently matches an optical axis L of the measurement light.) The reticle plate 140 has a collimation index 141 and a display unit 142.

The collimation index 141 may have a crosshair shape as one example, or may otherwise have a shape such as rectangular frame, circular frame. The collimation index 141 may be formed on a plate that is transparent to visible light by printing, etching, or the like, or may be displayed by using a transmissive liquid crystal.

The display unit 142 is configured to show a user a measurement result of a distance to an object and/or a height by a character, an image or the like, using the transmissive liquid crystal or the like. Instead of providing the display unit 142 directly on the reticle plate 140, the display unit 142 may be composed of a reflective liquid crystal and an optical system configured to guide an image to be displayed using the liquid crystal to the reticle plate 140. The display unit 142 may display the irradiating direction (the measurement direction) of the measurement light, a remaining battery level, an alert, a clock, or the like, in addition to the distance to the object and/or height determined by the processing unit 300. In particular, by displaying the irradiating direction of the measurement light in the display unit 142, even when a shaking of the attitude of the body has occurred, the irradiating direction in which the measurement light deflected by the correction lens as described below is actually irradiated can be shown to the user.

The eye piece 150 is an optical element configured to condense the incident light beam and send it rearward as a light beam $A_3$. Inside the range finder 10, the front end of the eye piece 150 faces the rear end of the erecting prism 120.

The objective lens 110, the erecting prism 120, the reticle plate 140, and the eye piece 150 constitute the collimation unit by which the user collimates the range finder 10 relative to the object. The collimation unit shares a part of the optical system with the light projecting unit 100, and thus apparent optical axes of the light projecting unit 100 and the collimation unit match in the range finder 10.

Among light reflected or scattered from an object located in front of the range finder 10, a light beam $A_1$ that propagates within a range of the prospective angle of the objective lens 110 enters the collimation unit. The light beam $A_1$ is condensed via the objective lens 110 as a light beam $A_2$ and emitted to the rear of the range finder 10 as a light beam $A_3$ through the erecting prism 120, the reticle plate 140 and the eye piece 150. Thus, the user can observe an erect normal image of the object through the eye piece 150.

The collimation index 141 arranged on the reticle plate 140 is superimposed on the image of the object observed by the user through the eye piece 150. Thus, the user can collimate the range finder 10 to the object. In this case, because the apparent optical axes of the light projecting unit 100 and the collimation unit match as described above, the measurement light is irradiated at the position indicated by the collimation index 141.

The correction unit 400 is a unit configured to deflect light according to the shaking of the attitude of the range finder 10 and perform image blur correction, and includes a correction lens 410, a driving unit 420, a correction control unit 430, a first sensor 440, a shaking detection sensor 442, a second sensor 450, and a reticle control unit 143. Note that a series of operations of the image blur correction are also referred to as a correction operation.

The correction lens 410 is one example of a shaking correction optical system configured to deflect the measurement light (light beam $B_3$.) The correction lens 410 is arranged on a reference axis $L_0$ between the objective lens 110 and the erecting prism 120, and is configured to deflect the measurement light by displacing in a direction that intersect with the reference axis $L_0$ (in the present embodiment, two axial directions orthogonal to each other in a plane orthogonal to the reference axis $L_0$) (i.e. change an optical axis direction in which the measurement light is irradiated.) As a correction lens 410, for example, an internal focusing lens can be employed. Moreover, a vari-angle prism that can deform asymmetrically relative to the center axis may be employed.

Note that it can be said that an optical axis through which the measurement light transmits when the correction lens 410 is at a predetermined position, for example, a reference position that is not displaced is the reference axis $L_0$.

The driving unit 420 is a unit configured to be controlled by the correction control unit 430 and drive the correction lens 410 in a direction that intersect with the reference axis $L_0$. The driving unit 420 includes a voice coil motor, a piezoelectric motor, or the like, for example.

The correction control unit 430 is a unit configured to perform drive control of the correction lens 410 via the driving unit 420. The correction control unit 430 is configured to perform feedback control of driving the correction lens 410 by determining a target drive amount of the correction lens 410 based on a detection result of a shaking amount of the body acquired from the first sensor 440 (in particular, the shaking detection sensor 442), and controlling the driving unit 420 based on the target drive amount and a detection result of a position of the correction lens 410 acquired from the second sensor 450 (in particular, a displacement sensor 451). Thus, the position of the correction lens 410 can be controlled with high accuracy.

The first sensor 440 is a sensor or a group of sensors configured to detect an attitude of the body including the range finder 10, and includes an attitude sensor 441 as one example. The first sensor 440 is provided in an enclosure of the range finder 10 or on a circuit board fixed in the enclosure, and thus a detection result of the first sensor 440 reflects an attitude of the body.

In this context, the attitude means a time averaged orientation and inclination of the body, and is represented by an azimuth (i.e. an azimuth in the horizontal plane) pp and an angle (i.e. an angle relative to the horizontal plane or the vertical axis) 0 in the reference coordinate. Note that, for example, the angle can be detected from a detection result of angular velocity or acceleration by an inclination sensor such as an angular velocity sensor, an acceleration sensor, and, for example, the azimuth can be detected by an azimuth sensor such as a geomagnetic sensor. A measureable angular range is ±89 degrees for example, and a measureable azimuth range is ±180 degrees for example. The detection results are transmitted to the processing unit 300.

The shaking detection sensor 442 is a sensor configured to detect a shaking amount of the attitude of the body including the range finder 10. In this context, the shaking means a small displacement from the time averaged orientation and inclination of the body, in particular, a small displacement of the azimuth and angle associated with a small vibration of the body that may be caused by hand shaking or the like, and is represented by a small displacement of the azimuth (yawing) $\Delta\varphi$ and a small displacement of the angle (pitching) $\Delta\theta$. Note that the small displacements can be detected by a gyro sensor, for example. The detection results are transmitted to the processing unit 300 and the correction control unit 430.

Note that a change and a shaking of the attitude of the body can be distinguished by a displacement amount or level of displacement speed, for example. For example, when the attitude of the body varies within a range that can be corrected by driving the correction lens 410, the variation can be considered to be a shaking, and when the attitude of the body varies beyond the range that can be corrected, the variation can be considered to be a change of the attitude. In this context, the angular range that can be corrected is ±0.5 degrees and preferably ±a few degrees, for example. Moreover, when the attitude of the body varies at a speed within a range that can be followed by the attitude sensor 441, the variation can be considered to be a change of the attitude, and when the attitude of the body varies at a speed beyond the range that can be followed, the variation can be considered to be a shaking.

The second sensor 450 is a group of sensors configured to detect a position of the shaking correction optical system or the reticle plate 140, and includes displacement sensors 451, 452 as one example.

The displacement sensor 451 is a sensor configured to detect a position of the correction lens 410, and detect a position (x, y) of the correction lens 410 in two axial directions orthogonal to the reference axis $L_0$, where the position is given in a reference $(x_0, y_0)$ of the reference axis, and output the detection result to the correction control unit 430 and the processing unit 300. As the displacement sensor, for example, a magnetic sensor such as a Hall element, an MR device, an optical sensor such as laser interferometer, or the like can be used.

The displacement sensor 452 is a sensor configured to detect a position of the reticle plate 140, and, detect a position (p, q) of the reticle plate 140 in two axial directions orthogonal to the optical axis of the collimation system, where the position is given in a reference $(p_0, q_0)$ of the optical axis, and output the detection result to the reticle control unit 143 and the processing unit 300. As the displacement sensor, for example, a magnetic sensor such as a Hall element, an MR device, an optical sensor such as laser interferometer, or the like can be used.

The reticle control unit 143 is a unit configured to perform drive control of the reticle plate 140. The reticle control unit 143 is configured to drive the reticle plate 140 in a plane that intersect with the optical axis of the collimation unit (which apparently matches with the optical axis L of the measurement light) based on a detection result of a position the reticle plate 140 acquired from the second sensor 450 (in particular, a displacement sensor 452). Thus, when the reticle plate 140 is offset from the optical axis of the collimation unit, the reticle plate 140 can be aligned on the optical axis.

Figure 2A:
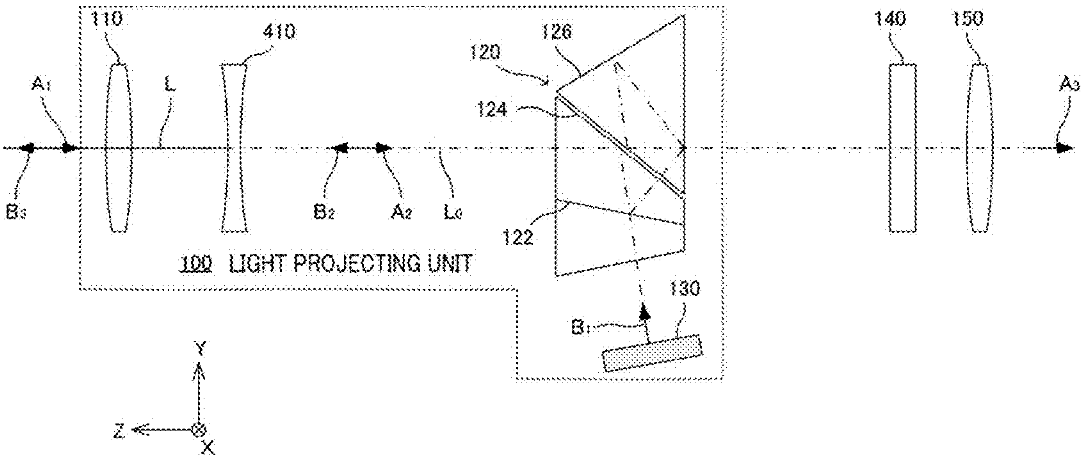
FIG. 2A shows a relationship between a reference axis and an irradiating direction in a state before an image blur correction function is activated.
Figure 2B:
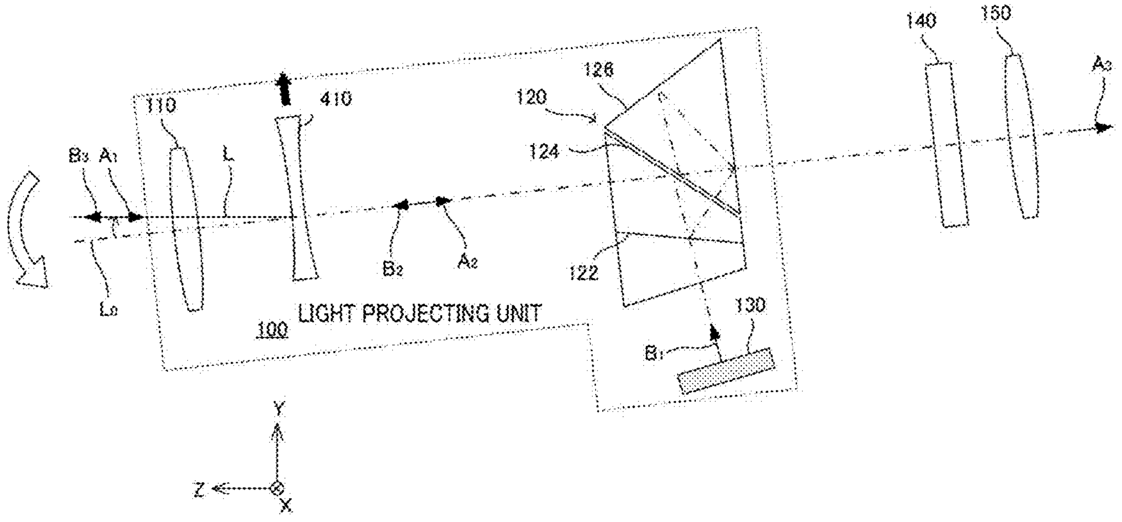
FIG. 2B shows a relationship between the reference axis and the irradiating direction when an image blur correction function is activated.

FIG. 2A and FIG. 2B respectively show a relationship between the reference axis $L_0$ and the irradiating direction (i.e. the optical axis L) in which the measurement light is actually irradiated in a state before the image blur correction function by the correction unit 400 is activated and in a situation where the image blur correction function by the correction unit 400 is activated. Assume that, while the body (i.e. the range finder 10) is performing a range finding operation facing in the horizontal direction as shown in FIG. 2A, a shaking of the body (i.e. the range finder 10) due to a hand shaking as indicated by a white arrow in FIG. 2B occurs and thus the orientation of the reference axis $L_0$ varies, and the position on the object to which the measurement light is irradiated is offset from the target. In this case, the correction unit 400 (in particular, the correction control unit 430) detects the shaking of the attitude of the body from the detection result of the shaking detection sensor 442 and also determines the shaking amount, and determines a target drive amount of the correction lens 410 according to the shaking amount, and performs drive control of the correction lens 410 via the driving unit 420 based on the target drive amount and the position (or displacement) of the correction lens 410 determined from the detection result of the displacement sensor 451, and thereby corrects the position of the correction lens 410 as indicated by a black arrow and deflect the measurement light. Thus, the shaking of orientation of the reference axis $L_0$ is optically cancelled out, i.e. the optical axis L is inclined in the arrow direction relative to the reference axis $L_0$ and overlaps the reference axis $L_0$ before the shaking occurs, and the measurement light (the light beam $B_3$) remains irradiated to the target on the object, and thereby, preventing a shaking of the irradiating direction in which the measurement light is irradiated (i.e. the measurement direction), the image blur correction can be performed.

Note that the correction unit 400 may perform the correction operation at all time, or may perform the correction operation only when the range finder 10 is in use. When the range finder 10 is in use may be, for example, when some operation by a user is detected such as when an eye of the user looking into the eye piece 150 is detected, when the user operates the operation button 133. After the operation is detected, the correction operation by the correction unit 400 may be stopped when the operation by the user is not detected beyond a predetermined time period.

Note that, in the range finder 10 according to the present embodiment, the configuration is employed in which the correction unit 400 performs the image blur correction by driving the correction lens 410 in a direction intersecting with the reference axis $L_0$, but, without limited thereto, a configuration may be employed in which the correction unit 400 performs the image blur correction by driving the correction lens 410 in a direction inclined relative to the reference axis $L_0$, by asymmetrically deforming a deformable optical element relative to the reference axis $L_0$, or by any combination thereof to thereby drive and correct the position or the shape of the shaking correction optical system. In such case, the second sensor 450 further includes a sensor configured to detect an inclination or a shape of the correction lens 410.

In a case of deforming the optical element, a vari-angle prism that is asymmetrically deformable relative to the center axis may be employed as the shaking correction optical system for example, and its shape may be changed by asymmetrically displacing glass plates sandwiching liquid contained in the vari-angle prism. In such case, the second sensor 450 may include a sensor configured to detect a deformation amount of the vari-angle prism.

The control unit 132 is a unit configured to control the range finding operation by the light projecting unit 100 or the like and the correction operation by the correction unit 400. For example, the control unit 132 is configured to adjust the intensity, the number of emission, the cycle or the like of the measurement light emitted from the light emitting unit 130, and start a range finding operation in accordance with driving of the correction lens 410 in the correction unit 400, and also transmit the timing of emission of the measurement light to the processing unit 300. Thus, the processing unit 300 can process a detection signal of the reflected light outputted from the detection unit 200 in accordance with irradiation of the measurement light by the light projecting unit 100, after the image blur correction function is activated. The control unit 132 includes an operation button 133 provided on the body of the range finder 10, and is configured to start the range finding operation described below by a user turning on the device by pressing the operation button.

The detection unit 200 is a unit configured to detect light reflected from the object and output a detection signal. The detection unit 200 includes a light receiving lens 210, a band pass filter 220, and a light receiving element 230.

The light receiving lens 210 is an optical element configured to condense the light reflected from the object (i.e. a light beam $C_1$) and send it to the light receiving element 230 as a light beam $C_2$. Note that the light receiving lens 210 has an optical axis different from that of the objective lens 110 of the light projecting unit 100.

The band pass filter 220 is an optical element configured to transmit light in a narrow band including the reflected light and block or attenuate light of other bands. The band pass filter 220 is arranged behind the light receiving lens 210.

The light receiving element 230 is an element configured to receive the reflected light and output an electrical signal corresponding to its intensity (also referred to as a light receiving signal). As the light receiving element 230, for example, a photodiode, a phototransistor or the like that are sensitive to the band of the measurement light can be employed. The light receiving element 230 is arranged behind the band pass filter 220. Note that, in terms of eliminating the influence of background light on the measurement light, the light receiving area of the light receiving element 230 is preferably smaller.

In the detection unit 200 configured as described above, the light beam $C_1$ reflected or scattered from the object located in front of the range finder 10 enters the light receiving lens 210. The light beam $C_1$ is condensed by the light receiving lens 210, passes the band pass filter 220 as the light beam $C_2$ and is received by the light receiving element 230. The light receiving element 230 outputs a light receiving signal corresponding to the intensity of the received light to the conversion unit 240.

The conversion unit 240 is a unit configured to convert the light receiving signal outputted from the light receiving element 230 and supply it to the processing unit 300. The conversion unit 240 is configured to amplify the light receiving signal outputted from the light receiving element 230, convert it to a binary signal according to a predetermined threshold value, generate a signal synchronized to a sampling clock by performing digital sampling, and supply it as a detection signal to the processing unit 300. Note that the detection signal may be stored in a memory (not shown.)

The processing unit 300 is a unit configured to determine a distance to the object and a height and an irradiating direction (i.e. a measurement direction) in which the measurement light is irradiated. In this context, the processing unit 300 is configured to determine a linear distance D to the irradiating point of the light on the object based on the detection result of the detection unit 200, determine the irradiating direction (the azimuth $\varphi$ and the angle $\theta$) based on the detection results of the first sensor 440 and the second sensor 450, and determine a horizontal distance d to the object and a height H of the irradiating point of the measurement light on the object based on the determined linear distance D and the irradiating direction $\varphi$, $\theta$. In this context, the height H means the height difference between a height at which the body of the range finder 10 is positioned and a height at which the irradiating point of the measurement light on the object is positioned.

The linear distance D to the irradiating point of the measurement light on the object is calculated by $D=T\times c/2$ using a light speed c, by determining, based on the detection result of the detection unit 200, a detection time T from the irradiation of the measurement light by the light projecting unit 100 to the detection of the reflected light by the detection unit 200. In this context, because the detection time T is the time required for the light to move a distance corresponding to a reciprocation from the measurement position at which the measurement light is emitted to the object, ½ of the detection time T is multiplied by the light speed. Note that the detection time T may be determined by averaging results respectively obtained for multiple times of irradiation of the measurement light.

The irradiating direction (the azimuth φ and the angle θ) is determined by a direction (an azimuth $\varphi_0$ and an angle $\theta_0$) of the reference axis $L_0$ determined based on the detection result of the first sensor 440 (attitude sensor 441) and angle correction amount determined based on the detection result of the displacement sensor 451, i.e. by correcting the direction of the reference axis $L_0$ according to the angle correction amount.

Figure 3A:
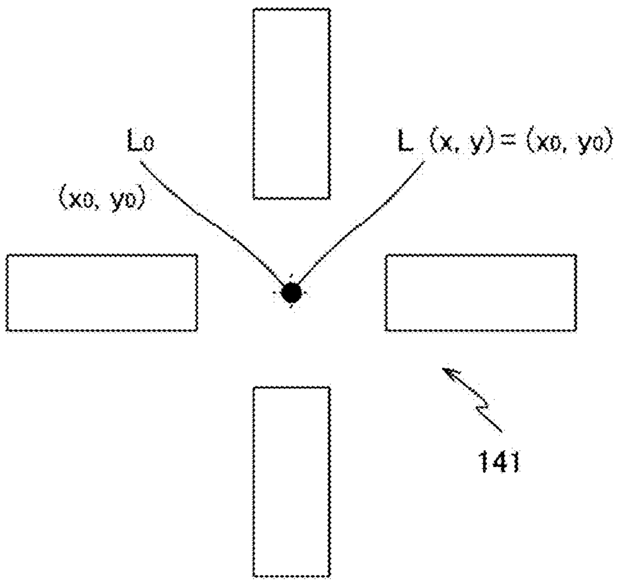
FIG. 3A shows a relationship between a collimation index and the reference axis in a state in which the image blur correction function is not activated.
Figure 3B:
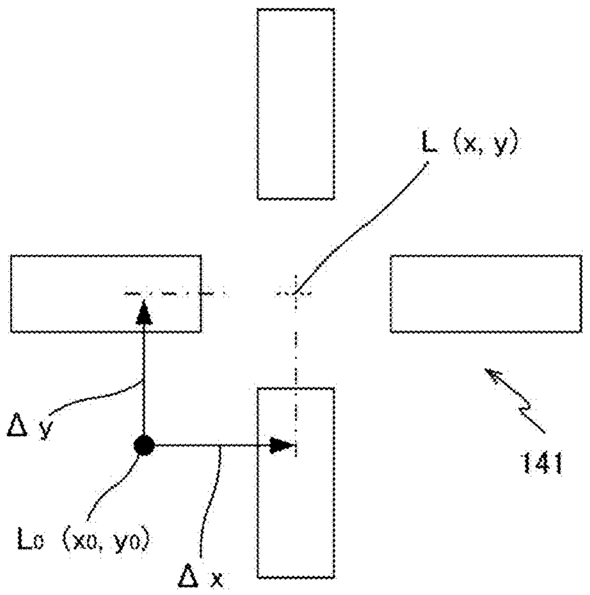
FIG. 3B shows a relationship between the collimation index and the reference axis in a state in which the image blur correction function is activated, and a detection target of a displacement sensor.

FIG. 3A and FIG. 3B respectively show a positional relationship between the collimation index 141 (on which an image of the object is superimposed) and the reference axis $L_0$ in a state in which the image blur correction function is not activated and in a state in which the image blur correction function is activated, and a detection target of the displacement sensor 451. In this context, two reference axes defining a collimation coordinate x, y are optically parallel to a plane orthogonal to the reference axis $L_0$, and a displacement of the correction lens 410 by the correction unit 400 corresponds to a displacement of the reference axis $L_0$ on the collimation coordinate. When the user observes the object through the eye piece 150, in a state in which the image blur correction function is not activated, the reference axis $L_0$ (position $x_0$, $y_0$) appears to be positioned at the center of the collimation index 141 (which is equal to the position x, y of the optical axis L) as shown in FIG. 3A. That is, the target on the object is collimated on the center of the collimation index 141, the body (i.e. the reference axis $L_0$) is oriented to the target, and the measurement light is irradiated along the reference axis $L_0$.

On the other hand, when a shaking of the body occurs due to a hand shaking and thereby the image blur correction function is activated, the reference axis $L_0$ appears to shift from the center of the collimation index 141 as shown in FIG. 3B. That is, the orientation of the reference axis $L_0$ varies in association with the shaking of the body, and the reference axis $L_0$ is offset from the target on the object. However, by the image blur correction function being activated, the irradiating direction (i.e. the optical axis L) in which the measurement light is irradiated remains on the target on the object. Thus, while the reference axis $L_0$ shifts from the center (position x, y) of the collimation index 141, the target on the object is collimated and the measurement light is irradiated on the center of the collimation index 141. Displacements $\Delta x = x - x_0$, $\Delta y = y - y_0$ of the center (i.e. the optical axis L) of the collimation index 141, where the displacements are given in a reference of the reference axis $L_0$ at this time (position $x_0$, $y_0$), are detected by the displacement sensor 451.

Figure 4A:
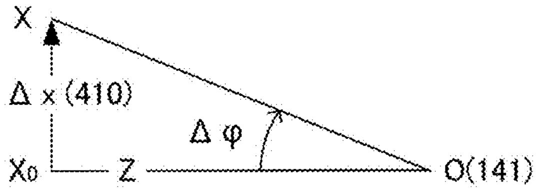
FIG. 4A shows one example of an azimuth correction.
Figure 4B:
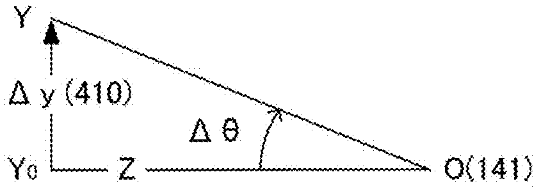
FIG. 4B shows one example of an angle correction.

FIG. 4A and FIG. 4B respectively show one example of an azimuth correction and an angle correction. The processing unit 300 is configured to determine a correction azimuth $\Delta\varphi = \tan^{-1}(\Delta x/Z)$ and a correction angle $\Delta\theta = \tan^{-1}(\Delta y/Z)$ of the irradiating direction relative to the reference axis $L_0$, based on the detection results Δx, Δy of the displacement sensor 451. In this context, Z is an optical distance from the center of the light emitting unit 130 (conjugate with the center of collimation O of the collimation index 141 on the reticle plate 140) to the correction lens 410. In this context, an angle formed by the horizontal plane (XZ-plane) as the reference and the irradiating direction of light deflected by the correction lens 410 is an irradiating angle in a YZ-plane, and can be determined by correcting the correction angle Δθ relative to the attitude of the body detected by the first sensor 440. Moreover, the displacement amount when the correction lens 410 is displaced and the displacement ΔX of the center of the collimation index 141 may not be the same displacement amount. For example, if the rate of the displacement amount of the center of the collimation index 141 to the displacement amount of the correction lens 410 is determined in advance as a correction factor, the displacement ΔX of the center of the collimation index 141 can be determined by correcting the displacement amount of the correction lens 410 by the displacement sensor 451 using the correction factor.

Note that, in a case where alignment is performed by driving the reticle plate 140, the angle correction amounts (Δφ, Δθ) may be further calculated by using the detection result of the displacement sensor 452 (the position p, q of the reticle plate 140.) In such case, the processing unit 300 stores the detection result (the positions p, q of the reticle plate 140) of the displacement sensor 452 one after another, then calculates the difference ($\Delta p = p - p0$, $\Delta q = q - q0$) between the position (p, q) of the reticle plate 140 when the shaking of the body is detected according to the detection result of the shaking detection sensor 442 and the position ($p_0$, $q_0$) of the reticle plate 140 stored before the shaking of the body is detected, and determines a correction azimuth $\Delta\varphi = \tan^{-1}((\Delta x - \Delta p)/Z)$ and a correction angle $\Delta\theta = \tan^{-1}((\Delta y - \Delta q)/Z)$, where the correction azimuth and the correction angle are given in a reference of the position of the reticle plate 140 aligned using the difference.

The processing unit 300 is configured to determine the irradiating direction (the azimuth $\varphi = \varphi_0 + \Delta\varphi$ and the angle $\theta = \theta_0 + \Delta\theta$) by correcting the direction (the azimuth $\varphi_0$ and the angle $\theta_0$) of the reference axis $L_0$ using the correction azimuth Δφ and the correction angle Δθ thus determined. I.e. the irradiating direction of the measurement light is determined relative to the coordinate axis of the reference coordinate.

The horizontal distance d to the object and the height H of the irradiating point of the measurement light on the object are determined by $d = D\cos(\theta)$, $H = D\sin(\theta)$, based on the linear distance D to (the irradiating point of the measurement light on) the object and the irradiating direction (in particular, the angle θ) determined above. Note that the horizontal distance is defined as a distance on the horizontal plane given the body as the reference, and the height is defined as the position on the vertical axis given the body as the reference (i.e. the height difference between the height at which the range finder 10 is positioned and the height at which the object is positioned.) In this context, the angle θ may be not only represented by an angle, but also represented by trigonometric functions like cos(θ), sin(θ), tan(θ).

The processing unit 300 is configured to display the determined horizontal distance d, height H, irradiating direction (the azimuth φ and the angle θ) on the display unit 142 of the reticle plate 140. The processing unit 300 may store the determined information to a storage device (not shown.) The display unit 142 of the reticle plate 140 may use a liquid crystal, or may display by projecting the detection result such as the horizontal distance to the reticle plate 140.

Note that, in the range finder 10 according to the present embodiment, the processing unit 300 is configured to display on the display unit 142 the horizontal distance d, the height H, the irradiating direction (the azimuth φ and the angle θ) shaking-corrected when the image blur correction function is activated, but alternatively, when the shaking of the attitude of the body is detected based on the detection results of the first sensor 440 or the second sensor 450, the processing unit 300 may determine the horizontal distance d, the height H, and the irradiating direction determined before the shaking is detected as the horizontal distance d to the object, the height H, and the irradiating direction in which the measurement light is currently irradiated and display them on the display unit 142. Alternatively, displayed images on the display unit 142 may be stopped or turned off, or the like. Thus, when a shaking of the attitude of the body has occurred, a shaking of the displayed image on the display unit 142 can be prevented and the display unit 142 may display an alert of occurrence of a shaking, or the like.

Moreover, the processing unit 300 may determine whether the detection result of the position (or deformation amount) of the correction lens 410 by the displacement sensor 451 follows the shaking amount of the attitude of the body determined from the detection result of the shaking detection sensor 442, and, when it is determined that the detection result follows the shaking amount, determine the direction of the reference axis $L_0$ determined from the detection results of the attitude sensor 441 and the shaking detection sensor 442 as the irradiating direction in which the measurement light is currently irradiated and display it on the display unit 142. In such case, the direction (the azimuth $\varphi_0$ and the angle $\theta_0$) of the reference axis $L_0$ is determined based on the detection result of the attitude of the body by the attitude sensor 441, and, by correcting it using the detection result of a shaking amount of the attitude of the body by the shaking detection sensor 442, the irradiating direction is determined. Thus, when the shaking of the attitude of the body has occurred, a shaking of the displayed images on the display unit 142 can be prevented.

Figure 5:
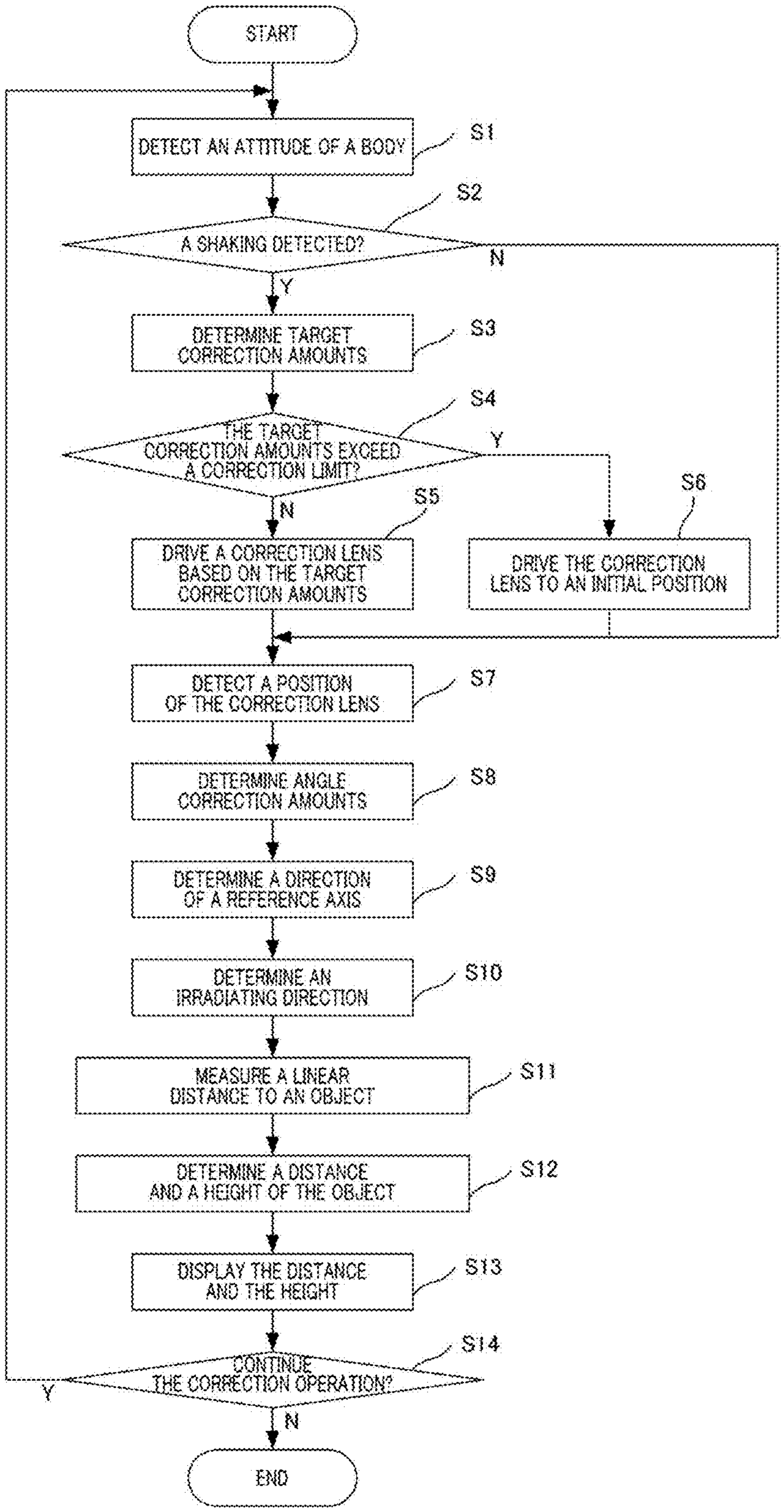
FIG. 5 shows an operation flow of a measurement method of a measurement direction, a distance to an object, and a height of the object according to the present embodiment.

FIG. 5 shows an operation flow of a measurement method of the irradiating direction of the measurement light (i.e. the measurement direction), the distance to the object, and the height of the object according to the present embodiment. The operation flow is started by the control unit 132, when the user presses the operation button 133 and thereby the device is turned on.

In Step S1, the first sensor 440 detects an attitude and a shaking of the range finder 10 irradiating the measurement light to the object along the body, i.e. the reference axis $L_0$. At this time, the attitude sensor 441 included in the first sensor 440 detects the attitude of the body, and the shaking detection sensor 442 detects the shaking amount of the attitude of the body.

In Step S2, the correction control unit 430 determines whether a shaking of the attitude of the body is detected. The correction control unit 430 detects a shaking of the attitude of the body from the detection result of the shaking detection sensor 442 and determines the shaking amount. Note that a shaking may be considered to be detected if the determined shaking amount exceeds the driving accuracy of the correction lens 410 by the driving unit 420, i.e. the accuracy of the image blur correction, for example. When the correction control unit 430 detects a shaking, the process shifts to Step S3, and when the correction control unit 430 detects no shaking, the process shifts to Step S7.

In Step S3, the correction control unit 430 determines target correction amounts according to the detection result of the shaking amount of the attitude of the body. The target correction amounts are targets of correction amounts in the image blur correction, and are target displacement amounts ($d\varphi$, $d\theta$) of the azimuth and angle for inclining the optical axis L relative to the reference axis $L_0$ by driving the correction lens 410. The correction control unit 430 determines the target correction amounts according to the shaking amount of the body determined in Step S1. Typically, the target displacement amounts ($d\varphi$, $d\theta$) is determined to cancel out the shaking of the body.

In Step S4, the correction control unit 430 determines whether the target correction amounts exceed a correction limit. The correction control unit 430 derives target drive amounts (dx, dy) of the correction lens 410 from the target displacement amounts ($d\varphi$, $d\theta$) determined in Step S2 for applying the displacement amounts, and determines whether the target drive amounts exceed a range that the driving unit 420 can drive the correction lens 410. When the correction control unit 430 determines that the target correction amounts do not exceed the correction limit, the shaking of the attitude of the body detected in Step S1 can be determined as relatively small and caused by a hand shaking, and therefore the process shifts to Step S5. On the other hand, when the correction control unit 430 determines that the target correction amounts exceed the correction limit, the shaking of the attitude of the body can be determined as relatively big and caused by the user intentionally changing the orientation of the body (i.e. the measurement direction), and therefore the process shifts to Step S6.

In Step S5, the correction control unit 430 corrects the position of the correction lens 410 according to the shaking amount of the attitude of the body, i.e. based on the target correction amounts determined in Step S3. The correction control unit 430 determines the position (or displacement) of the correction lens 410 from the detection result of the displacement sensor 451, and performs drive control of the correction lens 410 via the driving unit 420 such that the position (or displacement) matches the target drive amounts. Thus, the correction lens 410 is driven to the position corresponding to the target drive amounts, and the optical axis L is inclined to the azimuth and angle of the target displacement amounts ($d\varphi$, $d\theta$) relative to the reference axis $L_0$.

According to Steps S1 to S5, the image blur correction functions by driving the shaking correction optical system. As described with FIG. 2B, the shaking of the orientation of the reference axis $L_0$ associated with the shaking of the attitude of the body is optically cancelled out by correcting the position of the correction lens 410 to thereby deflect the measurement light, i.e. the optical axis L is inclined relative to the reference axis $L_0$ and overlaps the reference axis $L_0$ before the shaking occurs, and the measurement light remains irradiated to the target on the object, and thereby, preventing a shaking of the irradiating direction in which the measurement light is irradiated (i.e. the measurement direction), the image blur correction can be performed.

Note that, instead of driving the correction lens 410 in a direction intersecting with the reference axis $L_0$, the image blur correction may be performed by driving the correction lens 410 in a direction inclined relative to the reference axis $L_0$, by asymmetrically deforming a deformable optical element relative to the reference axis $L_0$, or by any combination thereof, to thereby drive and correct the position or the shape of the shaking correction optical system. In such case, a target inclining amount of the correction lens 410 or a target deformation amounts of the deformable optical element may be derived from the target displacement amounts ($d\varphi$, $d\theta$) determined in Step S3 for applying the target displacement amounts, and, in Step S4, it may be determined whether these amounts exceed a range that the correction lens 410 can be inclined or the optical element can be deformed.

In Step S6, the correction control unit 430 drives the correction lens 410 to an initial position. In this context, the initial position may be defined as a position on the reference axis $L_0$, for example. Thus, the image blur correction function is deactivated.

In Step S7, the second sensor 450 (displacement sensor 451) detects the position (x, y) of the correction lens 410. According to the detection result, the displacements $\Delta x=x-x_0$, $\Delta y=y-y_0$ of the correction lens 410 is determined, where the displacements are given in a reference of the reference axis $L_0$ (position $x_0$, $y_0$).

In Step S8, the processing unit 300 determines angle correction amounts, i.e. a correction azimuth $\Delta\varphi$ and a correction angle $\Delta\theta$ of the irradiating direction relative to the reference axis $L_0$, based on the detection result of the displacement of the correction lens 410. The processing unit 300 determines the correction azimuth $\Delta\varphi=\tan^{-1}(\Delta x/Z)$ and the correction angle $\Delta\theta=\tan^{-1}(\Delta y/Z)$ of the irradiating direction, using the displacement $\Delta x$, $\Delta y$ of the correction lens 410 determined in Step S7. In this context, Z is an optical distance from the center of collimation O of the collimation index 141 on the reticle plate 140 to the correction lens 410.

Note that, when the correction lens 410 is driven in a direction inclined relative to the reference axis $L_0$ or when the deformable optical element is asymmetrically deformed relative to the reference axis $L_0$, the second sensor 450 detects an inclination of the correction lens 410 or a deformation amount of the optical element and determines the angle correction amounts (the correction azimuth $\Delta\varphi$ and the correction angle $\Delta\theta$) according to the detection result.

Note that, when alignment is performed by driving the reticle plate 140, the angle correction amounts ($\Delta\varphi$, $\Delta\theta$) may be calculated by further using the detection result of the displacement sensor 452 (the position p, q of the reticle plate 140.) In such case, for example in Step S7, the displacement sensor 452 detects a position p, q of the reticle plate 140 and stores the detection result (stores, each time the operation flow of FIG. 5 is repeated). In Step S8, the processing unit 300 calculates the difference ($\Delta p=p-p_0$, $\Delta q=q-q_0$) between the position (p, q) of the reticle plate 140 when the shaking of the body is detected according to the detection result of the shaking detection sensor 442 and the position ($p_0$, $q_0$) of the reticle plate 140 stored before the shaking of the body is detected, and determines a correction azimuth $\Delta\varphi=\tan^{-1}((\Delta x-\Delta p)/Z)$ and a correction angle $\Delta\theta=\tan^{-1}((\Delta y-\Delta q)/Z)$, where the correction azimuth and the correction angle are given in a reference of the position of the reticle plate 140 aligned using the difference.

In Step S9, the processing unit 300 determines a direction (an azimuth φ0 and an angle θ0) of the reference axis L0 based on the detection result of the attitude of the body by the attitude sensor 441.

In Step S10, the processing unit 300 determines an irradiating direction in which the measurement light is irradiated based on the detection result of the attitude of the body and the position of the correction lens 410. The processing unit 300 determines an irradiating direction (an azimuth $\varphi=\varphi_0+\Delta\varphi$ and an angle $\theta=\theta_0+\Delta\theta$) by correcting the direction (the azimuth $\varphi_0$ and the angle $\theta_0$) of the reference axis $L_0$ determined in Step S9 using the correction azimuth $\Delta\varphi$ and the correction angle $\Delta\theta$ of the irradiating direction determined in Step S8.

In Step S11, the processing unit 300 determines a linear distance D to the irradiating point of the measurement light on the object. First, the light projecting unit 100 irradiates the measurement light from the light projecting unit 100 toward the object along the reference axis $L_0$. Then, the detection unit 200 detects light reflected from the object. Finally, the processing unit 300 calculates, based on the detection result of the detection unit 200, the linear distance $D=T\times c/2$ using a light speed c, by determining a detection time T from irradiation of the measurement light by the light projecting unit 100 to detection of the reflected light by the detection unit 200. Note that the detection time T may be determined by averaging results respectively obtained for multiple times of irradiation of the measurement light.

In Step S12, the processing unit 300 determines a horizontal distance d to the object and a height H of the irradiating point of the measurement light on the object. The processing unit 300 calculates the horizontal distance $d=D\cos(\theta)$ and the height $H=D\sin(\theta)$, based on the linear distance D determined in Step S11 and the irradiating direction (in particular, the angle θ) determined in Step S10. The processing unit 300 may store the calculated information to a storage device (not shown.)

In Step S13, the processing unit 300 displays the horizontal distance d and the height H determined in Step S12 on the display unit 142 of the reticle plate 140, along with the irradiating direction (the azimuth φ and the angle θ.)

In Step S14, the processing unit 300 determines whether to continue the correction operation. The processing unit 300 determines to continue the correction operation and back to Step S1 when the user keeps pressing the operation button 133 to turn on the device, and determines not to continue (i.e. end) the correction operation and end the flow when the user released the operation button 133 to turn off the device, for example.

Note that, in the measurement method according to the present embodiment, the direction of the reference axis $L_0$ is determined based on the detection result of the attitude of the body by the attitude sensor 441 and the irradiating direction is determined by correcting it using the detection result of displacement of the correction lens 410 by the displacement sensor 451 and displayed on the display unit 142, but, when the shaking of the attitude of the body is detected based on the detection result of the shaking of the attitude of the body by the shaking detection sensor 442 or the position (or the deformation amount) of the correction lens 410 by the displacement sensor 451, the horizontal distance d, the height H and the irradiating direction determined before the shaking is detected may be determined as the horizontal distance d to the object, the height H, and the irradiating direction in which the measurement light is currently irradiated and displayed on the display unit 142. Alternatively, displayed images on the display unit 142 may be stopped or turned off, or the like. Thus, when a shaking of the attitude of the body has occurred, a shaking of the displayed images on the display unit 142 can be prevented.

Moreover, it may be determined whether the detection result of the position (or deformation amount) of the correction lens 410 by the displacement sensor 451 follows the shaking amount of the attitude of the body determined from the detection result of the shaking detection sensor 442, and, when it is determined that the detection result follows the shaking amount, the direction of the reference axis L0 determined from the detection results of the attitude sensor 441 and the shaking detection sensor 442 may be determined as the irradiating direction in which the measurement light is currently irradiated and displayed on the display unit 142. In such case, the direction (the azimuth $\varphi_0$ and the angle $\theta_0$) of the reference axis $L_0$ is determined based on the detection result of the attitude of the body by the attitude sensor 441, and, by correcting it using the detection result of a shaking amount of the attitude of the body by the shaking detection sensor 442, the irradiating direction is determined. Thus, when the shaking of the attitude of the body has occurred, a shaking of the displayed images on the display unit 142 can be prevented.

According to the range finder 10 and the measurement method according to the present embodiment, the processing unit 300 can determine, based on a detection result of the attitude of the body (i.e. the range finder 10) by the first sensor 440 (attitude sensor 441) and a detection result of the position of the correction lens 410 by the second sensor 450 (displacement sensor 451), an irradiating direction (i.e. measurement direction) in which the measurement light deflected by the correction lens 410 which position is corrected according to the shaking of the attitude (the azimuth φ and the angle θ) of the body determined from the detection result of the first sensor 440 is actually irradiated. With this, the horizontal distance to the object and the height can be determined accurately.

Note that, according to the range finder 10 according to the present embodiment, the correction unit 400 includes the first sensor 440 (attitude sensor 441) configured to detect an attitude of the body including the light projecting unit 100 and the shaking detection sensor 442 configured to detect a shaking of the body, but, for example, the correction unit 400 may only include the attitude sensor 441 configured to respond to the shaking at a sufficient speed and detect the attitude of the body. In such case, a detection signal of the first sensor 440 may be sampled in a constant period, the attitude of the body may be determined according to its moving average (i.e. time average), and a deviation from the moving average may be determined as a shaking of the attitude.

Moreover, a relationship between the shaking of the body and the deflection amount of the light for correcting the shaking and a relationship between a position of the optical element of the correction optical system for correcting the shaking and the deflection amount of the light may be respectively acquired in advance as a correction table, and, the position of the optical element to be corrected when a shaking of the body has occurred may be extracted by referring to the correction table. In this case, because control of the position of the optical element can be performed with high accuracy by combining it with the detection result of the second sensor 450, the irradiating angle can be determined more accurately. Moreover, the irradiating angle may be determined based on the detection result of the first sensor 440 and the deflection amount of the light for correcting the shaking, without using the detection result of the second sensor 450. In this case, the position of the optical element according to the deflection amount of light to be corrected can be extracted using the correction table. Note that the correction table may be stored in advance in a storage unit separately provided in the device or may be read from exterior into the device via a storage medium in which the correction table is stored.

Moreover, the range finder 10 according to the present embodiment may be provided in any optical device such as a digital camera, a video camera, for example.

Moreover, according to the present embodiment, in the range finder 10 with the image blur correction function, the irradiating direction in which the measurement light deflected by the image blur correction function is irradiated is determined, and thereby the horizontal distance to the object and the height are determined and displayed to the user, but, in an optical instrument having an observation optical system for observing an object, for example, a scope with collimation and vibration isolation functions, the irradiating direction in which the measurement light deflected by the collimation and vibration isolation functions is irradiated may be determined, and thereby the horizontal distance to the object and the height may be determined and displayed to the user. In such case, the optical instrument can be configured using units equal to each component of the range finder 10 previously described. That is, the optical instrument can include the first sensor 440 configured to detect an attitude of its body, the shaking correction optical system (for example, the correction lens 410) driven based on the shaking amount detected by the shaking detection sensor 442, the second sensor 450 configured to detect a position of the shaking correction optical system, the processing unit 300 configured to determine an observation angle that is an angle for observing the object, based on the detection results of the first sensor 440 and the second sensor 450.

Note that an observation angle may further be displayed in addition to the horizontal distance to the object and the height. Moreover, when the range finding function is omitted from the scope, the display unit does not display the horizontal distance and the height, but displays the observation angle.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

Note that the operations, procedures, steps, and stages of each process performed by an device, system, program, and method shown in the claims, embodiments, or diagrams can be performed in any order as long as the order is not indicated by “prior to,” “before,” or the like and as long as the output from a previous process is not used in a later process. Even if the process flow is described using phrases such as “first” or “next” in the claims, embodiments, or diagrams, it does not necessarily mean that the process must be performed in this order.

As is apparent from the description above, according to the embodiments of the present invention, the distance detection device, the optical instrument, and the method for detecting the attitude of the distance detection device can be implemented.

What is claimed is:

1. A distance detection device for measuring a distance to an object by irradiating light comprising:

a first sensor configured to detect an attitude of the distance detection device;

a shaking correction optical system configured to be driven and perform an image blur correction based on a shaking amount detected by a shaking detection sensor;

a second sensor configured to detect a position of the shaking correction optical system to which the image blur correction was performed; and a processing unit configured to determine an irradiating angle of the light in which the image blur correction was performed by the shaking correction optical system based on detection results of the first sensor and the second sensor.

2. The distance detection device according to claim 1, wherein driving the shaking correction optical system includes changing a shape of an optical element that forms the shaking correction optical system, wherein the second sensor includes detecting a deformation amount of the optical element.

3. The distance detection device according to claim 1, wherein the first sensor is an attitude sensor including at least one of an angular velocity sensor, an acceleration sensor, and a geomagnetic sensor.

4. The distance detection device according to claim 1, wherein the processing unit is configured to determine the irradiating angle by a first angle determined from the detection result of the first sensor and an angle correction amount determined after the image blur correction is performed from the detection result of the second sensor.

5. The distance detection device according to claim 4, wherein the processing unit is configured to determine, based on the distance and the irradiating angle, a height difference between a height at which the distance detection device is positioned and a height at which the object is positioned.

6. The distance detection device according to claim 5, further comprising a display unit configured to display at least one of the distance, the height difference, and the irradiating angle.

7. The distance detection device according to claim 6, wherein the display unit is configured to display at least one of the distance, the height difference, and the irradiating angle before the shaking is detected, when the shaking detection sensor detects a shaking.

8. The distance detection device according to claim 1, wherein the first sensor is provided in an enclosure or on a circuit board of the distance detection device.

9. The distance detection device according to claim 1, further comprising an optical element provided with a reticle, wherein the second sensor is configured to detect a position of the reticle.

10. The distance detection device according to claim 9, wherein the processing unit is configured to:

store a first position of the reticle detected by the second sensor before a shaking detection; and determine an angle correction amount from the difference between a second position of the reticle detected by the second sensor during the shaking detection and the first position.

11. The distance detection device according to claim 1, further comprising:

a light projecting unit configured to emit the light toward the object in a constant period, wherein the light projecting unit is configured to emit the light in the constant period before and after the shaking correction optical system is driven.

12. The distance detection device according to claim 1, wherein the processing unit is configured to determine, based on the distance and the irradiating angle, a height difference between a height at which the distance detection device is positioned and a height at which the object is positioned.

13. An optical instrument having an observation optical system for observing an object comprising:

a first sensor configured to detect an attitude of the optical instrument, a shaking correction optical system configured to be driven and perform an image blur correction based on a shaking amount detected by a shaking detection sensor, a second sensor configured to detect a position of the shaking correction optical system to which the image blur correction was performed, and a processing unit configured to determine an observation angle of the object to which the image blur correction was performed by the shaking correction optical system based on detection results of the first sensor and the second sensor.

14. The optical instrument according to claim 13, further comprising:

a light projecting unit configured to irradiate light toward the object in a constant period, wherein the light projecting unit is configured to emit the light in the constant period before and after the shaking correction optical system is driven.

15. A method for detecting an attitude of a distance detection device for measuring a distance to an object by irradiating light comprising:

detecting an attitude of the distance detection device, driving a shaking correction optical system and performing an image blur correction based on a shaking amount detected by a shaking detection sensor, detecting a position of the shaking correction optical system to which the image blur correction was performed, and determining an irradiating angle of the light in which the image blur correction was performed by the shaking correction optical system based on detection results of the attitude of the distance detection device and the position of the shaking correction optical system.

16. The method for detecting the attitude of the distance detection device according to claim 15, wherein driving the shaking correction optical system includes changing a shape of an optical element that forms the shaking correction optical system is changed and wherein detecting the position of the shaking correction optical system includes detecting a deformation amount of the optical element.

17. The method for detecting the attitude of the distance detection device according to claim 15, wherein determining the irradiating angle of the light includes determining the irradiating angle by a first angle determined from the detection result of the attitude of the distance detection device and an angle correction amount determined from the detection result of the position of the shaking correction optical system.

18. The method for detecting the attitude of the distance detection device according to claim 15, wherein the distance detection device further comprises an optical element provided with a reticle, and wherein detecting the position of the shaking correction optical system includes further detecting a position of the reticle is further detected.

19. The method for detecting the attitude of the distance detection device according to claim 18, wherein determining the irradiating angle of the light includes storing a first position of the reticle detected before a shaking detection, and determining an angle correction amount from the difference between a second position of the reticle detected during the shaking detection and the first position.

20. The method for detecting the attitude of the distance detection device according to claim 15, further comprising:

irradiating light towards the object in a constant period, wherein the light is emitted in the constant period before and after the shaking correction optical system is driven.

21. A distance detection device for measuring a distance to an object by irradiating light comprising:

a first sensor configured to detect an attitude of the distance detection device, a shaking detection sensor configured to detect a shaking of the distance detection device, a shaking correction optical system configured to be driven for correcting the shaking detected by the shaking detection sensor including performing an image blur correction based on a shaking amount detected by the shaking detection sensor, and a processing unit configured to determine an irradiating angle of the light in which the image blur correction was performed by the shaking correction optical system based on a detection result detected by the first sensor and information corresponding to a position of the shaking correction optical system to be driven for correcting the shaking after the image blur correction was performed.

22. The distance detection device according to claim 21, wherein the information corresponding to the position of the shaking correction optical system includes at least any one of a shaking amount detected by the shaking detection sensor, a drive amount of the shaking correction optical system to be driven for correcting the shaking, and a deflection amount of the light to be deflected by driving the shaking correction optical system for correcting the shaking.

23. The distance detection device according to claim 21, further comprising:

a light projecting unit configured to irradiate light toward the object in a constant period, wherein the light projecting unit is configured to emit the light in the constant period before and after the shaking correction optical system is driven.

* * * * *